3,062,884
CATALYTIC HYDROGENATION OF 2,5-DIALK-OXY-β-NITROSTYRENE TO PRODUCE β-AMINO-ETHYLHYDROQUINONE
Milton Green, Winthrop, Mass., assignor to Polaroid Corporation, Cambridge, Mass., a corporation of Delaware
No Drawing. Filed June 8, 1955, Ser. No. 514,095
3 Claims. (Cl. 260—570.8)

This invention relates to novel chemical processes, and more particularly, to novel, improved processes of preparing β-aminoethylhydroquinone.

One object of this invention is to provide improved methods of preparing β-aminoethylhydroquinone whereby increased yields may be obtained, and more particularly, an improved synthesis of β-aminoethylhydroquinone from 2,5-dialkoxy-β-nitrostyrenes.

A further object of this invention is to provide improved methods of preparing pure β-aminoethylhydroquinone.

Other objects of the invention will in part be obvious and will in part appear hereinafter.

The invention accordingly comprises the processes involving the several steps and the relation and order of one or more of such steps with respect to each of the others which are exemplified in the following detailed disclosure, and the scope of the application of which will be indicated in the claims.

It has now been discovered that β-aminoethylhydroquinone be readily prepared in high yields by the reduction of 2,5 - dialkoxy - β - nitrostyrenes using palladinized barium sulfate as the catalyst, followed by removal of the alkoxy groups by hydrolysis with hydrogen bromide.

It has been further discovered that removal of the alkoxy groups by hydrolysis with hydrogen bromide may be accomplished in quantitative yields by refluxing under nitrogen in the presence of hydrogen bromide while fractionating off excess water.

The hydrogenation of 2,5-dialkoxy-β-nitrostyrenes to obtain the corresponding saturated amine has been attempted with various catalysts. Efforts to reproduce this reduction by prior art processes have resulted in poor yields and/or products which were difficult to purify. Use of palladinized barium sulfate, as herein contemplated, provides a simple reduction process with high yields and reaction products which may be simply and readily worked up.

The reduction is preferably performed in a mixture of acetic and sulfuric acids as the reaction medium. Suitable reaction conditions are room temperature and a pressure of 2 to 3 atmospheres. The reaction is preferably run for a short period after hydrogen uptake ceases.

Conventional palladinized barium sulfate catalysts may be used in this process. A preferred catalyst comprises about 7–8%, by weight, of palladium. It may be prepared by precipitating barium sulfate in the presence of freshly precipitated palladium.

As hereinbefore noted, a further feature of this invention is an improved method of removing the alkoxy groups by hydrolysis. Efforts to conduct this hydrolysis using hydrogen bromide in accordance with prior art procedures gave only incomplete hydrolysis.

It has now been discovered that a substantially quantitative hydrolysis of the alkoxy groups may be obtained by refluxing with hydrogen bromide while fractionating off water to maintain a substantially constant concentration of hydrogen bromide. In a preferred embodiment, the refluxing is conducted under nitrogen. A large excess of hydrogen bromide also has been found to be helpful; in a preferred embodiment, a quantity of hydrogen bromide about fifteen to thirty, and preferably about twenty, times the weight of dialkoxy phenethylamine is used. Removal of excess water during the refluxing maintains the concentration of hydrogen bromide at the highest possible level, i.e., at approximately 48%, and also removes the alkyl bromide by-product formed during the hydrolysis; this removal is preferably a continuous removal of water. The mixture is refluxed for about four to eight hours.

In a preferred embodiment of this invention, the 2,5-dialkoxy-β-nitrostyrene employed is 2,5-dimethoxy-β-nitrostyrene.

The following examples of the preparation of β-aminoethylhydroquinone in accordance with this invention are given for illustrative purposes only.

Reduction 2,5-dimethoxy-β-nitrostyrene (5 g.) is dissolved in a mixture of glacial acetic acid (125 ml.) and concentrated sulfuric acid (19 g.). Five grams of palladinized barium sulfate are added and hydrogen is passed through the mixture at room temperature. The mixture is shaken continually during the reaction. Ninety percent of the theoretical amount of hydrogen (4 moles) is absorbed in 10 minutes, after which no further hydrogen uptake is noted. Shaking of the mixture is continued for a half hour, after which the mixture is cooled and sufficient 5 N sodium hydroxide is added to neutralize the sulfuric acid. Methanol (250 ml.) is then added to complete precipitation of sodium sulfate. The salt is washed and filtered with methanol and the combined filtrates and mother liquor are evaporated in vacuo. The residue is made strongly alkaline and extracted with 100 ml. of ether. The extract is dried over potassium hydroxide after which the solvent is removed and the residue distilled giving 3 g. (68% yield) of 2,5-dimethoxyphenethylamine boiling at 148° C./8 mm. The product is a pale yellow oil which forms a white hydrochloride melting at 139° C.

Hydrolysis

Concentrated hydrogen bromide (200 ml.) is added cautiously to 2,5-dimethoxyphenethylamine (16 g.) and the mixture is refluxed for five hours. Nitrogen is continually passed through the reflux mixture and water is fractionated off continuously to maintain the highest hydrogen bromide concentration. After refluxing, the mixture is evaporated in vacuo to dryness. Sufficient water to remove any traces of residual hydrogen bromide is added to the residue and the solution again evaporated in vacuo to dryness. The residue is dissolved in absolute ethanol and evaporated in vacuo to dryness, after which it is dried in a vacuum desiccator. A substantially quantitative yield of crystalline β-aminoethylhydroquinone hydrobromide, melting at 160–161° C., is obtained.

Since certain changes may be made in the above processes without departing from the scope of the invention herein involved, it is intended that all matter contained in the above description shall be interpreted as illustrative and not in a limiting sense.

What is claimed is:

1. The process of preparing a 2,5-dialkoxy-phenethylamine which comprises hydrogenating a 2,5-dialkoxy-β-nitrostyrene in the presence of a palladinized barium sulfate catalyst in a mixture of acetic and sulfuric acids as the reaction medium.

2. The process defined in claim 1 wherein said hydrogenation is conducted at room temperature.

3. The process defined in claim 1 wherein said 2,5-dialkoxy-β-nitrostyrene is 2,5-dimethoxy-β-nitrostyrene and said 2,5-dialkoxy-phenethylamine is 2,5-dimethoxy-phenethylamine.

(References on following page)

References Cited in the file of this patent

UNITED STATES PATENTS

| | | |
|---|---|---|
| 2,361,373 | Alles | Oct. 31, 1944 |
| 2,387,920 | Lowry | Oct. 30, 1945 |
| 2,653,977 | Craig et al. | Sept. 29, 1953 |

FOREIGN PATENTS

| | | |
|---|---|---|
| 406,149 | Germany | Nov. 14, 1924 |
| 360,266 | Great Britain | Nov. 5, 1931 |

OTHER REFERENCES

Kindler et al.: Ann. des Chem., vol. 511, pages 209–212 (1934). (Copy in Sci. Lib., U.S. Pat. Off.)

Skita et al.: Ber. 65, pages 424–431 (1932). (Copies available in Div. 6, U.S. Pat. Off.)

Sabatier: Catalysis in Organic Chemistry, D. Van Nostrand Co., New York, pages 35–6, Sec. 126 (1922). (Copies available in Div. 6, U.S. Pat. Off.)

Ellis: Hydrogenation of Organic Substances, D. Van Nostrand Co., New York, page 100, Sec. 879 (1930). (Copies available in Div. 6, U.S. Pat. Off.)

Weizmann: J. Am. Chem. Soc. 71, 4154–5 (1949). (Copy in Lib.)